(12) United States Patent
Batish et al.

(10) Patent No.: US 8,793,414 B2
(45) Date of Patent: Jul. 29, 2014

(54) STATUS INFORMATION SAVING AMONG MULTIPLE COMPUTERS

(75) Inventors: Arun Batish, Beaverton, OR (US);
Phong Doan Ly, Beaverton, OR (US);
Jason Charles Myers, Beaverton, OR (US); Sham Mysore, Beaverton, OR (US); Paul Vu, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/560,595

(22) Filed: Jul. 27, 2012

(65) Prior Publication Data

US 2012/0331212 A1    Dec. 27, 2012

Related U.S. Application Data

(63) Continuation of application No. 12/485,708, filed on Jun. 16, 2009, now Pat. No. 8,271,704.

(51) Int. Cl.
*G06F 13/38*    (2006.01)
*G06F 15/16*    (2006.01)

(52) U.S. Cl.
USPC .............................. 710/62; 710/73; 709/217

(58) Field of Classification Search
USPC .......................................................... 710/62
See application file for complete search history.

(56) References Cited

U.S. PATENT DOCUMENTS

| | | | |
|---|---|---|---|
| 6,256,014 B1 | 7/2001 | Thomas et al. | |
| 6,304,895 B1 | 10/2001 | Schneider et al. | |
| 6,378,009 B1 | 4/2002 | Pinkston et al. | |
| 6,567,869 B2 | 5/2003 | Shirley | |
| 6,901,455 B2 | 5/2005 | Gough | |
| 6,915,362 B2 * | 7/2005 | Ramsey et al. | 710/62 |
| 7,028,110 B2 | 4/2006 | Seki et al. | |
| 7,047,331 B2 | 5/2006 | Dickens | |
| 7,254,608 B2 | 8/2007 | Yeager et al. | |
| 7,284,278 B2 | 10/2007 | Anson et al. | |
| 7,424,419 B1 | 9/2008 | Fike et al. | |
| 7,428,606 B2 * | 9/2008 | Liu et al. | 710/62 |
| 7,478,182 B2 | 1/2009 | Schweig | |
| 7,480,905 B2 | 1/2009 | Nagao | |
| 7,490,516 B2 | 2/2009 | Hedtke et al. | |
| 7,506,051 B2 | 3/2009 | Becker et al. | |

(Continued)

OTHER PUBLICATIONS

First Office Action dated Feb. 8, 2011, pp. 1-17, for U.S. Appl. No. 12/485,708 by inventors A. Batish, P.D. LY, J.C. Myers, S. Mysore and P.VU, et al.

(Continued)

*Primary Examiner* — Titus Wong
(74) *Attorney, Agent, or Firm* — William K Konrad; Konrad Raynes Davda & Victor LLP

(57) ABSTRACT

Provided are techniques for status information saving among multiple computers. In one embodiment, a selected computer is operated using a plurality of input/output devices over switched input/output signal paths passing through a KVM (keyboard video mouse) switch positioned between the selected computer and the plurality of input/output devices. Status data is carried over signal paths passing through the KVM switch wherein the status data represents status information for a plurality of computers connected to the KVM switch. The status data passing through the KVM switch is stored in a memory coupled to the KVM switch. Other embodiments are described and claimed. Other embodiments are contemplated, depending upon the particular application.

25 Claims, 5 Drawing Sheets

(56) References Cited

U.S. PATENT DOCUMENTS

| | | | |
|---|---|---|---|
| 7,584,306 B2 | 9/2009 | Zhang | |
| 7,586,935 B2* | 9/2009 | Lee et al. | 370/463 |
| 7,640,382 B2* | 12/2009 | Blackwell et al. | 710/74 |
| 7,716,404 B2 | 5/2010 | Liu | |
| 7,730,205 B2 | 6/2010 | Rothman | |
| 7,747,702 B2 | 6/2010 | Anderson et al. | |
| 7,774,774 B1 | 8/2010 | Mulligan et al. | |
| 7,792,914 B2* | 9/2010 | Huang | 709/208 |
| 7,822,901 B2 | 10/2010 | Tseng et al. | |
| 7,844,765 B2 | 11/2010 | Katayama et al. | |
| 7,852,873 B2 | 12/2010 | Bird | |
| 7,853,740 B2 | 12/2010 | Liaw et al. | |
| 7,917,674 B2* | 3/2011 | Lin et al. | 710/73 |
| 2002/0124209 A1 | 9/2002 | Faust et al. | |
| 2003/0084133 A1 | 5/2003 | Chan et al. | |
| 2003/0145142 A1 | 7/2003 | Masuyama et al. | |
| 2005/0071442 A1 | 3/2005 | Becker et al. | |
| 2005/0179666 A1 | 8/2005 | Katayama et al. | |
| 2005/0225935 A1 | 10/2005 | Chen | |
| 2006/0007151 A1* | 1/2006 | Ram | 345/163 |
| 2006/0218536 A1 | 9/2006 | Kirilline et al. | |
| 2006/0259612 A1 | 11/2006 | De Oliveria et al. | |
| 2007/0016957 A1 | 1/2007 | Seaward et al. | |
| 2007/0038731 A1 | 2/2007 | Matsunaga et al. | |
| 2007/0070042 A1 | 3/2007 | Lin et al. | |
| 2007/0094426 A1* | 4/2007 | Chiang et al. | 710/73 |
| 2007/0208891 A1 | 9/2007 | Liu et al. | |
| 2007/0247430 A1 | 10/2007 | Huang | |
| 2007/0282997 A1 | 12/2007 | Trochman | |
| 2007/0294575 A1 | 12/2007 | Aichelen et al. | |
| 2008/0040527 A1 | 2/2008 | Filipov et al. | |
| 2008/0059626 A1 | 3/2008 | Campbell et al. | |
| 2009/0027344 A1 | 1/2009 | Matsunaga et al. | |
| 2009/0058804 A1 | 3/2009 | Nagao | |
| 2009/0063732 A1* | 3/2009 | Hayama | 710/36 |
| 2009/0128491 A1 | 5/2009 | Katayama et al. | |
| 2009/0144479 A1* | 6/2009 | Cui et al. | 710/316 |
| 2009/0164675 A1* | 6/2009 | Chen et al. | 710/64 |
| 2009/0259792 A1 | 10/2009 | Matsunaga et al. | |
| 2009/0271445 A1 | 10/2009 | Emaru et al. | |
| 2009/0319909 A1 | 12/2009 | Hsueh et al. | |
| 2010/0060571 A1 | 3/2010 | Chen et al. | |
| 2010/0064079 A1 | 3/2010 | Harvey et al. | |
| 2010/0100652 A1 | 4/2010 | Lin et al. | |
| 2010/0262863 A1 | 10/2010 | Hess | |
| 2010/0318717 A1 | 12/2010 | Batish et al. | |

OTHER PUBLICATIONS

Response dated May 9, 2011, pp. 1-20 to First Office Action dated Feb. 8, 2011, pp. 1-17, for U.S. Appl. No. 12/485,708 by inventors A. Batish, P.D. LY, J.C. Myers, S. Mysore and P.VU, et al.
Final Office Action dated Jun. 15, 2011, pp. 1-12, for U.S. Appl. No. 12/485,708 by inventors A. Batish, P.D. LY, J.C. Myers, S. Mysore and P.VU, et al.
Response dated Aug. 15, 2011, pp. 1-17, to Final Office Action dated Jun. 15, 2011, pp. 1-12, for U.S. Appl. No. 12/485,708 by inventors A. Batish, P.D. LY, J.C. Myers, S. Mysore and P.VU, et al.
Response dated Sep. 15, 2011, pp. 1-14, to Final Office Action dated Jun. 15, 2011, pp. 1-12, for U.S. Appl. No. 12/485,708 by inventors A. Batish, P.D. LY, J.C. Myers, S. Mysore and P.VU, et al.
Notice of Allowance dated Sep. 27, 2011, pp. 1-7, for U.S. Appl. No. 12/485,708 by inventors A. Batish, P.D. LY, J.C. Myers, S. Mysore and P.VU, et al.
RCE ans IDS dated Dec. 27, 2011, pp. 1-3, to Notice of Allowance dated Sep. 27, 2011, pp. 1-7, for U.S. Appl. No. 12/485,708 by inventors A. Batish, P.D. LY, J.C. Myers, S. Mysore and P.VU, et al.
Notice of Allowance dated May 17, 2012, pp. 1-12, for U.S. Appl. No. 12/485,708 by inventors A. Batish, P.D. LY, J.C. Myers, S. Mysore and P.VU, et al.

* cited by examiner

STATUS INFORMATION SAVING AMONG MULTIPLE COMPUTERS

CROSS-REFERENCE TO RELATED APPLICATION

This application is a continuation application of parent application Ser. No. 12/485,708, filed Jun. 16, 2009 now U.S. Pat. No. 8,271,704, entitled "STATUS INFORMATION SAVING AMONG MULTIPLE COMPUTERS", assigned to the assignee of the present application, and incorporated by reference in its entirety.

BACKGROUND

1. Field

Embodiments of the invention relate to status information saving among multiple computers.

2. Description of the Related Art

Multiple computers are frequently operated together. For example, in a typical datacenter, a number of computers may be mounted on a rack. A single console having various user input/output devices including a monitor, keyboard and a mouse pointing device, may be connected to each computer in turn through a KVM (Keyboard Video Mouse) switch. In this manner, a single keyboard, monitor and mouse may be used to manage each computer in turn by selecting the target computer using appropriate control inputs on the KVM switch. The selected target computer receives user control inputs from the user operated keyboard and mouse through the KVM switch and also provides video signals to drive the monitor through the KVM switch. To manage a different computer, the operator controls the KVM switch to select a different computer as the target computer to receive the keyboard and mouse inputs and provide the monitor video signals.

In other installations, several stand alone computers may be operated by a single console through a KVM switch. Again, the operator controls the KVM switch to select a different computer as the target computer to receive the keyboard and mouse inputs and provide the monitor video signals.

There are a number of different types of KVM switches. Earlier designs frequently included mechanical and electro-mechanical switches to switch amongst the various target computers. More recent designs typically include electronic switches.

The operating systems for a number of computers may be disrupted should an input/output device be unexpectedly disconnected. Accordingly, more recent KVM switches can emulate various input/output devices so that it appears to the computers as if the input/output devices of the console remain connected to each computer even though those computers may not be the selected target computer which is actually connected to the console. Accordingly, the KVM switch can provide signals at the ports connected to the computers, which emulate the various input/output devices for the non-selected computers.

Computers often maintain configuration and other status data in nonvolatile memory onboard the computer itself. Should the computer crash or otherwise malfunction, this status information can be useful in diagnosing the problem. To obtain the onboard status information, the computer may need to be powered on or rebooted. Some operating systems maintain such status information in a "dump" file which may be offloaded from the computer. Other operating systems may have various operations which can provide configuration or other status information.

SUMMARY OF EMBODIMENTS OF THE INVENTION

Provided are a method, computer program product, and system for status information saving among multiple computers. In one embodiment operations are provided including operating a first computer using a plurality of input/output devices over input/output signal paths passing through a KVM switch positioned between the first computer and the plurality of input/output devices, switching input/output signal paths passing through the KVM switch for the plurality of input/out devices to be between a second computer and the plurality of input/output devices instead of between the first computer and the plurality of input/output devices, and operating the second computer using the plurality of input/output devices over the switched input/output signal paths passing through the KVM switch positioned between the second computer and the plurality of input/output devices. In accordance with one embodiment, status data is carried over signal paths passing through the KVM switch wherein the status data represents status information for at least one of the first and second computers. The status data passing through the KVM switch is stored in a memory coupled to the KVM switch. Other embodiments are described and claimed. Other embodiments are contemplated, depending upon the particular application.

BRIEF DESCRIPTION OF THE DRAWINGS

Referring now to the drawings in which like reference numbers represent corresponding parts throughout.

DETAILED DESCRIPTION

Figure 1:
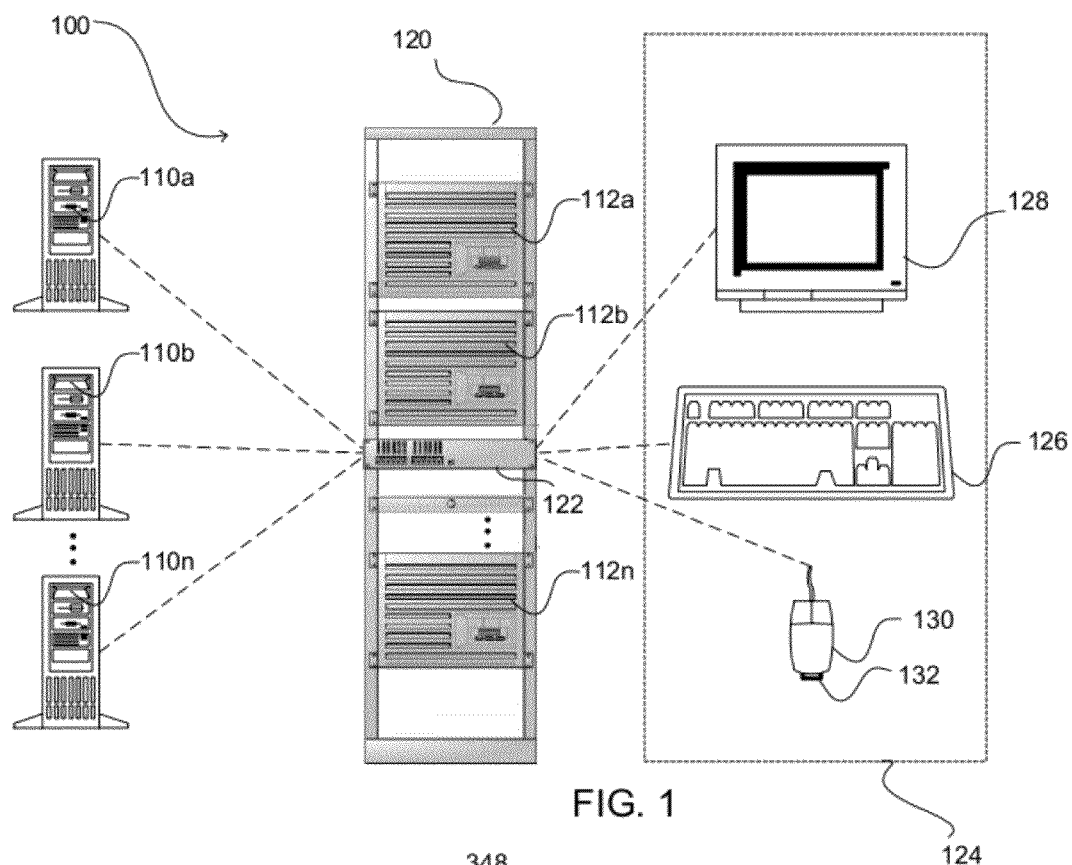
FIG. 1 illustrates details of a computing environment in accordance with certain embodiments.

In the following description, reference is made to the accompanying drawings which form a part hereof and which illustrate several embodiments of the invention. It is understood that other embodiments may be utilized and structural and operational changes may be made without departing from the scope of the invention.

A system in accordance with one embodiment of the present description is indicated generally at 100. The system 100 includes a plurality of computers 110a, 110b . . . 110n which may be freestanding computers, for example. The system 100 may alternatively include a plurality of rack-mounted computers 112a, 112b . . . 112 mounted on a rack 120. A KVM (keyboard, video, mouse) switch 122 permits a console 124 which includes a keyboard 126, a monitor 128 and a mouse 130, to be used to operate any one of the computers 110a-110n and 112a-112n.

The computers 110a, 110b . . . 110n and 112a, 112b . . . 112 may each comprise any computing device known in the art, such as a server, mainframe, workstation, personal computer, hand held computer, laptop telephony device, network appliance, etc. In addition to or instead of the keyboard 126, monitor 128 and mouse 130, the console may include any suitable input/output device which facilitates operating the computers of the system 100.

Figure 2:
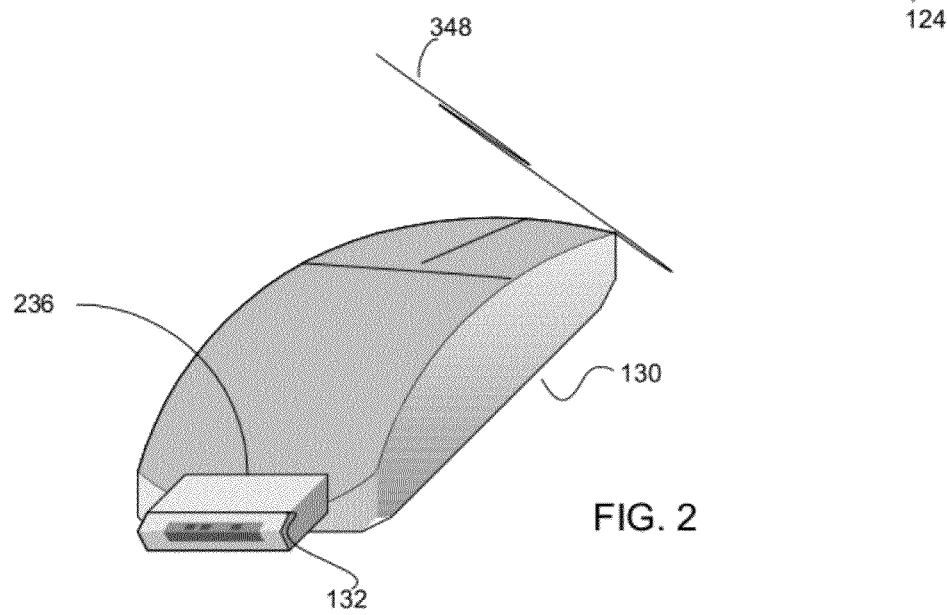
FIG. 2 illustrates a mouse pointing device having a removable memory for a computing environment in accordance with certain embodiments.

In accordance with one embodiment of the present description and as described in greater detail below, the KVM switch 122 facilitates saving status information for each of the computers 110a-110n and 112a-112n in a central memory 132 which is accessible by each of the computers 110a-110n and 112a-112n. As shown in FIG. 2, the memory 132 may in one embodiment, be a nonvolatile memory such as a Secure Digital (SD) flash memory card which is removably inserted into a card slot 236. In addition, the memory 132 and card slot 236 may be conveniently located on one of the input/output devices connected to the KVM switch 122 such as the mouse 130. It is appreciated that the central memory 132 may be other types of memory and may be located elsewhere such as on a monitor 128, keyboard 126 or a KVM switch 122, console 124 or a rack 120, for example.

Figure 3A:
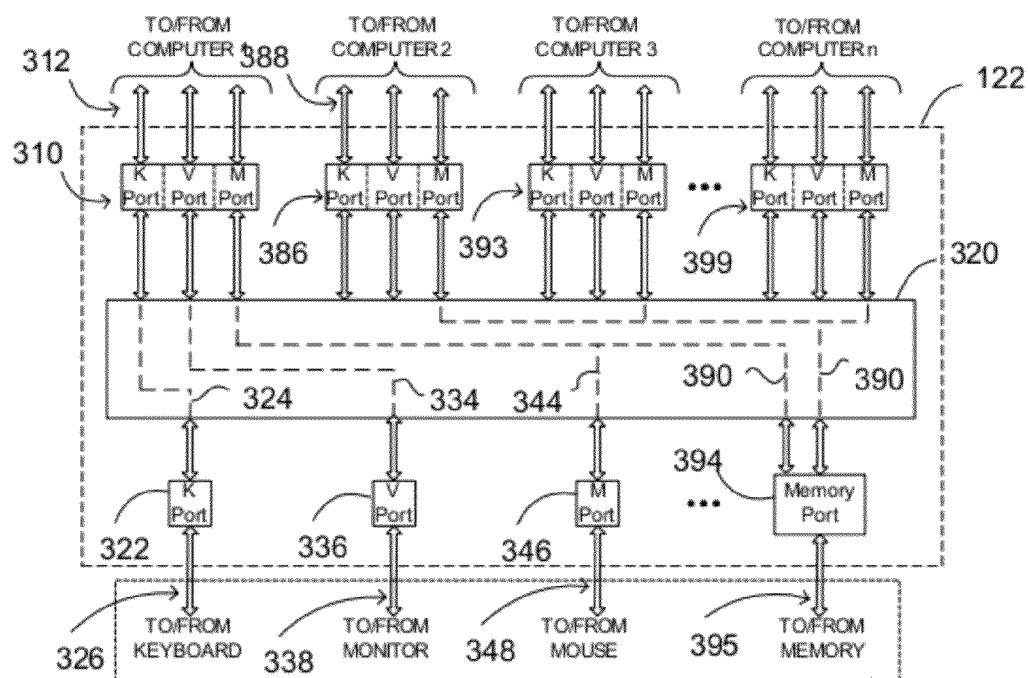
FIGS. 3a, 3b illustrate various switched input/output paths and status data paths of a KVM switch operating in a computing environment in accordance with certain embodiments.

FIG. 3a illustrates the KVM switch 122 configured to permit a first computer (computer 1) to be operated by the console 124. The KVM switch 122 may be configured by inputting commands through the keyboard 126 or through any suitable input device.

In this embodiment, the KVM switch 122 has a set of ports 310 which include a keyboard (K) port, a monitor (V) port and a mouse (M) port coupled by suitable cables 312 to corresponding keyboard, monitor and mouse ports of a first computer such as computer 112a, for example. In the configuration illustrated in FIG. 3a, a switching network logic 320 of the KVM switch 122 provides and maintains an input/output signal path 324 which logically connects the keyboard port of the ports 310 to the keyboard port 322 which is in turn connected by a suitable cable 326 to the keyboard 126 of the console 124. Similarly, the switching network logic 320 of the KVM switch 122 provides and maintains an input/output signal path 334 which logically connects the monitor port of the ports 310 to the monitor port 336 which is in turn connected by a suitable cable 338 to the monitor 128 of the console 124. Also, the switching network logic 320 of the KVM switch 122 provides and maintains an input/output signal path 344 which connects the mouse port of the ports 310 to the mouse port 346 which is in turn connected by a suitable cable 348 to the mouse 130 (FIG. 2) of the console 124 (FIG. 1).

Figure 4:
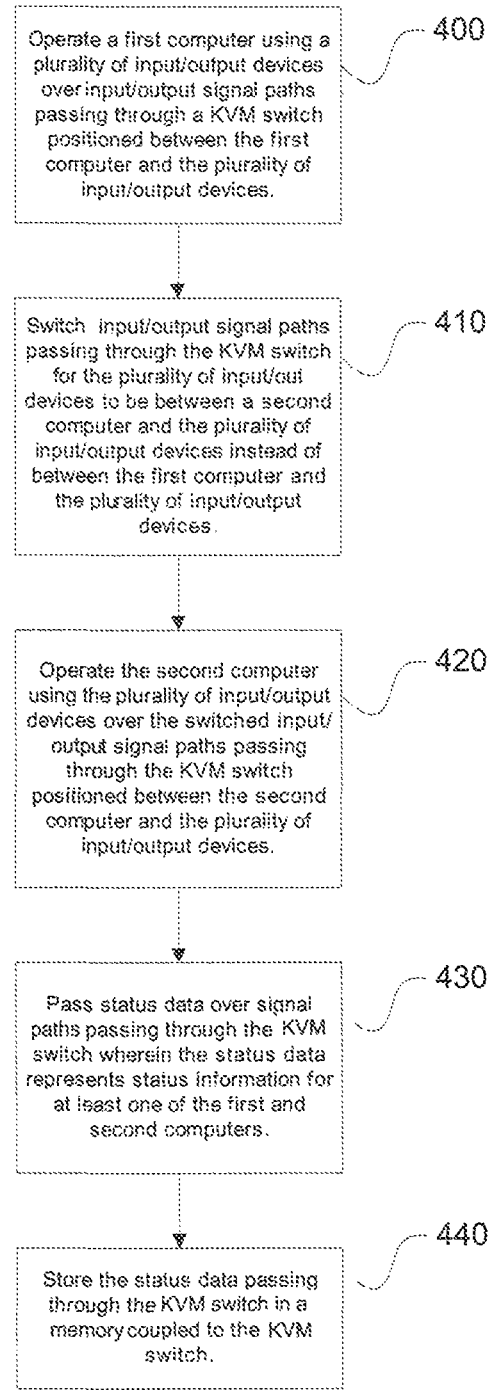
FIG. 4 illustrates logic performed by a status information saving system in accordance with certain embodiments.

FIG. 4 shows one example of operations to save status data among a number of computers in accordance with one embodiment of the present description. In one operation, a first computer is operated (block 400) using a plurality of input/output devices over input/output signal paths passing through a KVM switch positioned between the first computer and the plurality of input/output devices. In the example of FIG. 3a, a first computer such as computer 1, is selected to be operated using a plurality of input/output devices such as the keyboard 126, monitor 128 and mouse 130 of the console 124, over input/output signal paths 324, 334, 344 passing through the KVM switch 122 positioned between the first computer and the plurality of input/output devices.

Accordingly, during operation of the selected computer 1, the selected computer 1 provides video data for the monitor 128 over the input/output signal path 334 for viewing by the operator. Video data output by the remaining, non-selected computers, computer 2 through computer n, is not routed by the KVM switch to the monitor 122 in this embodiment.

Similarly, keyboard strokes entered on the keyboard 126 by the operator are routed to the selected computer 1 over the input/output path 324. Conversely, keyboard strokes entered on the keyboard 126 by the operator are not routed to remaining, non-selected computers, computer 2 through computer n, in this embodiment since computer 1 was selected.

Similarly, mouse movements entered on the mouse 130 by the operator are routed to the selected computer 1 over the input/output path 344. Conversely mouse movements entered on the mouse 130 by the operator are not routed to remaining, non-selected computers, computer 2 through computer n, in this embodiment since computer 1 was selected.

Figure 3B:
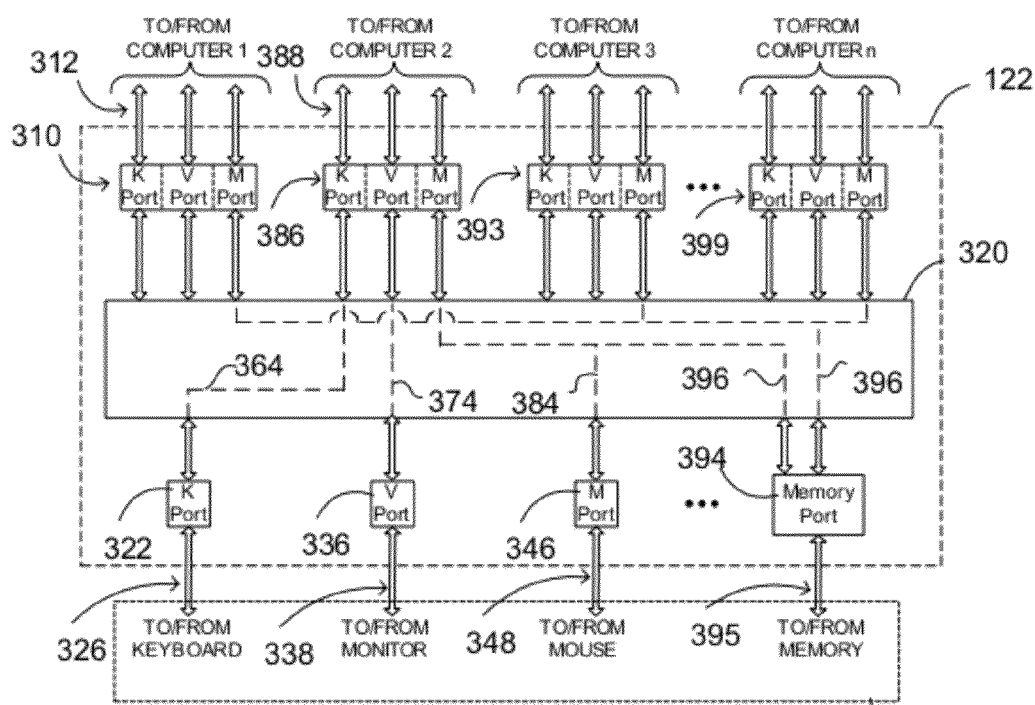

In another operation as depicted in FIG. 4, input/output signal paths passing through the KVM switch for the plurality of input/out devices, are switched (block 410) to be between a second computer and the plurality of input/output devices instead of between the first computer and the plurality of input/output devices. In the example of FIG. 3b, a second computer such as computer 2, is selected to be operated (block 420, FIG. 4) using a plurality of input/output devices such as the keyboard 126 (FIG. 1), monitor 128 and mouse 130 of the console 124, over input/output signal paths 364, 374, 384 passing through the KVM switch 122 positioned between the second computer and the plurality of input/output devices. In this embodiment, the KVM switch 122 has a set of ports 386 which include a keyboard (K) port, a monitor (V) port and a mouse (M) port coupled by suitable cables 388 to corresponding keyboard, monitor and mouse ports of a second computer (2) such as computer 112b, for example. In the configuration illustrated in FIG. 3b, the switching network logic 320 of the KVM switch 122 provides and maintains an input/output signal path 364 which logically connects the keyboard port of the ports 386 to the keyboard port 322 connected by the cable 326 to the keyboard 126 of the console 124. Similarly, the switching network logic 320 of the KVM switch 122 provides and maintains an input/output signal path 374 which connects the monitor port of the ports 388 to the monitor port 336 connected by the cable 338 to the monitor 128 of the console 124. Also, the switching network logic 320 of the KVM switch 122 provides and maintains an input/ output signal path 384 which connects the mouse port of the ports 386 to the mouse port 346 connected by the cable 348 to the mouse 130 of the console 124.

Accordingly, during operation of the selected computer 2, the selected computer 2 provides video data for the monitor 128 over the input/output signal path 374 for viewing by the operator. Video data output by the remaining, non-selected computers, computer 1 and computer 3 through computer n, is not routed by the KVM switch to the monitor 122 in this embodiment.

Similarly, keyboard strokes entered on the keyboard 126 by the operator are routed to the selected computer 2 over the input/output path 364. Conversely, keyboard strokes entered on the keyboard 126 by the operator are not routed to remaining, non-selected computers, computer 1 and computer 3 through computer n, in this embodiment since computer 2 was selected.

Similarly, mouse movements entered via the mouse 130 by the operator are routed to the selected computer 2 over the input/output path 384. Conversely mouse movements entered via the mouse 130 by the operator are not routed to remaining, non-selected computers, computer 1 and computer 3 through computer n, in this embodiment since computer 2 was selected. However, it is appreciated that in some applications, an operator may configure a KVM switch to operate more than one computer at a time.

Although computer 1 is logically disconnected from the operator input/output devices of the console 123 in this configuration of FIG. 3b since computer 2 was selected, the switch network logic 122 emulates operator input/output devices similar to the keyboard 126, monitor 128 and mouse 130 as if computer 1 remained logically connected to the operator input/output devices. An unexpected disconnection of input/output devices can disrupt operation of some computers. Accordingly, the switch network logic 122 in this embodiment generates appropriate signals and outputs them at the keyboard, monitor or mouse ports of the ports 310 connected to the computer 1 so that computer 1 can continue operation without the switching of the input/output devices from computer 1 to computer 2 causing a disruption in operation of computer 1. Similarly, the switch network logic 320 in this embodiment generates appropriate signals and outputs them at the keyboard, monitor or mouse ports of the ports connected to the remaining nonselected computers so that the other nonselected computers can continue operation without the switching of the input/output devices causing a disruption in operation of those other computers connected to the KVM switch 122.

In another operation as depicted in FIG. 4, status data is passed (block 430) over signal paths passing through the KVM switch wherein the status data represents status information for at least one of the first and second computers. In the illustrated embodiment of FIGS. 1 and 2, the central memory for storing status data for the computers is positioned on the mouse 130. Accordingly, in the configuration illustrated in FIG. 3a, the switching network logic 320 of the KVM switch 122 provides and maintains a data signal path 390 which logically connects the mouse port of the ports 310 to a memory port 394 which is in turn connected by a suitable cable 395 to the central memory 132 carried by the mouse 130. Accordingly, computer 1, the selected computer in the configuration of FIG. 3a, can generate status data which is passed over data signal paths including data signal path 390 passing through the KVM switch 122 wherein the status data represents status information for the computer 1.

In another operation, the status data passing through the KVM switch may be stored (block 440, FIG. 4) in a memory coupled to the KVM switch. In the configuration of FIG. 3a, status data from computer 1, which is passed over data signal path 390 of the KVM switch 122, may be stored in the central memory 132. In some applications, the mouse cable 348 and the central memory cable 394 may be a single, common cable or may be separate, depending upon the particular application.

In accordance with another aspect of the present description, the remaining nonselected computers may also store associated status data in the central memory notwithstanding that the remaining nonselected computers are logically disconnected by the KVM switch from the keyboard, monitor and mouse of the console. Accordingly, in the configuration illustrated in FIG. 3a, the switching network logic 320 of the KVM switch 122 provides and maintains additional status data signal paths 390 which logically connect the mouse ports of the ports 388, 393, 399 to the memory port 392 connected to the central memory 132 carried by the mouse 130. Accordingly, computers 2 through n, the non-selected computers in the configuration of FIG. 3a, can each generate status data which is passed over data signal paths including data signal paths 390 passing through the KVM switch 122 wherein the status data represents status information for the associated computer 2 through n. Similarly, status data for the associated computers 2 through n may be stored in the central memory 132 notwithstanding that the computers 2 through n are non-selected in the configuration of FIG. 3a.

Similarly, in the configuration illustrated in FIG. 3b, the switching network logic 320 of the KVM switch 122 provides and maintains status data signal paths 396 which logically connect the mouse ports of the ports 312, 388, 393, 399 to the memory port 394 connected to the central memory 132 carried by the mouse 130. Accordingly, both the selected computer 2 and the nonselected computers in the configuration of FIG. 3b, can each generate status data which is passed over data signal paths including data signal paths 396 passing through the KVM switch 122 wherein the status data represents status information for the associated computers 1 through n. Similarly, status data for the associated computers 1 through n may be stored in the central memory 132 notwithstanding that the computer 1 and computers 3 through n are non-selected in the configuration of FIG. 3b.

Figure 5:
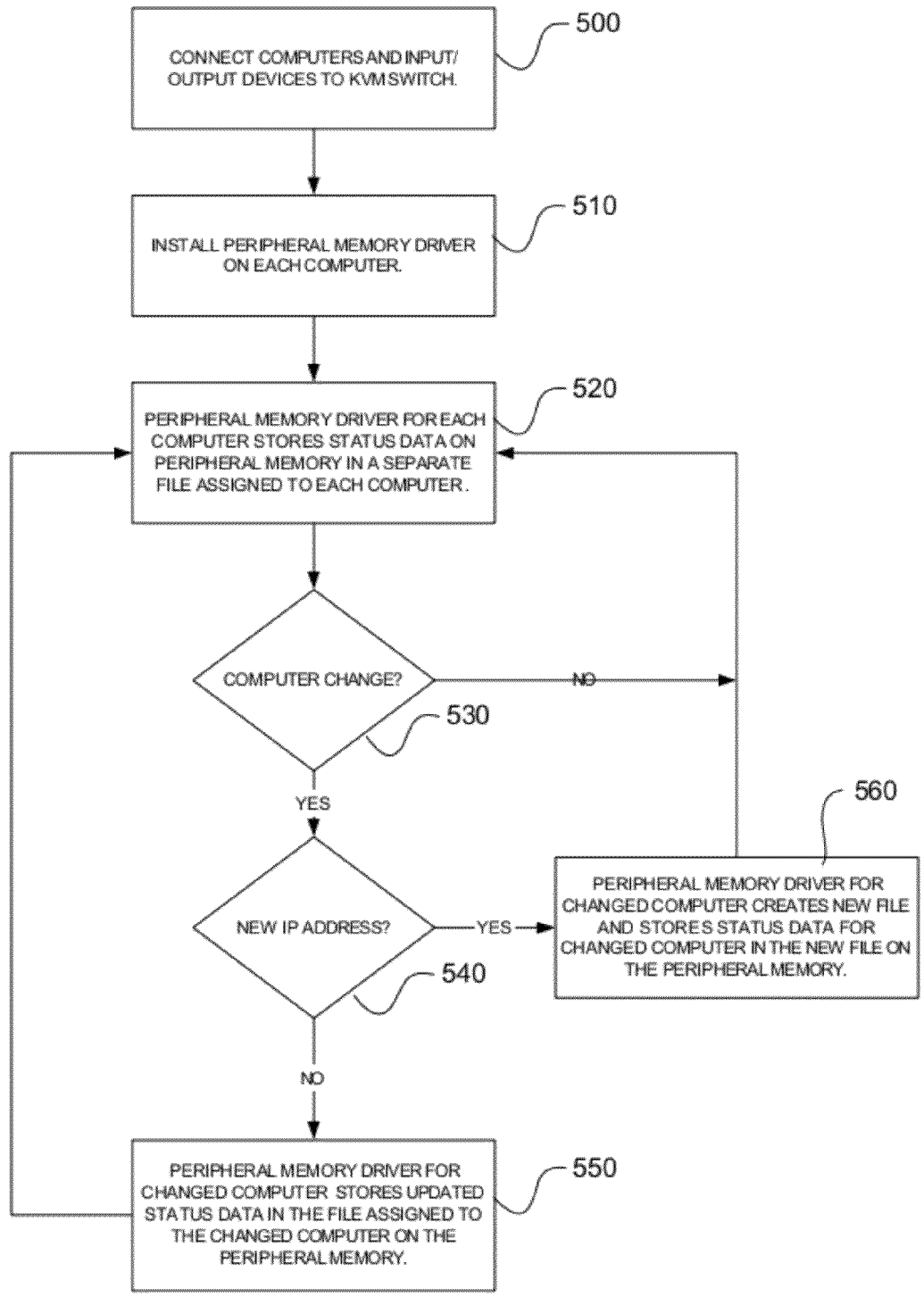
FIG. 5 illustrates another example of logic performed by a status information saving system in accordance with another embodiment.

FIG. 5 shows another example of operations to save status data among a number of computers in accordance with another embodiment of the present description. In one operation, the computers such as computers 110a, 110b ... 110n and/or computers 112a, 112b ... 112n may be connected (block 500) to a KVM switch such as the KVM switch 122 as depicted in FIGS. 3a, 3b. Connected to the KVM switch are operator input/output devices including a keyboard, monitor, and pointing device such as a mouse. Any suitable connections may be used including cables, wires, conductors, connectors, busses, printed circuit boards, wireless, serial, parallel, Universal Serial Bus (USB), and Ethernet as appropriate, depending upon the particular application.

In another operation, a peripheral memory driver for a peripheral memory such as the central memory 132, may be installed (block 510) on each computer connected to the KVM switch. In the illustrated embodiment, the central memory 132 is connected to the KVM switch 122 through the mouse 130. Accordingly, the peripheral memory driver may be conveniently loaded as a part of the mouse driver for each computer. However, as previously mentioned, the central memory 132 may be positioned on other peripheral devices such as the keyboard 126 or the monitor 128 of the console 124, for example. Accordingly, the peripheral memory driver may be loaded as part of the driver of the associated peripheral device. Alternatively, the central memory 132 may be separate from any other peripheral device. In either case, the peripheral memory driver for the central memory may be loaded separately from drivers of other peripheral devices.

Once the peripheral memory driver is loaded on a particular computer, that computer may be rebooted to complete the installation and activation of the peripheral memory driver on that computer. The computers may be rebooted serially in turn or may be rebooted at the same time, depending upon the particular application. It is appreciated that in some computers and operating systems, the peripheral memory driver may be loaded, installed and activated without rebooting the computer hosting the driver.

In another operation, the peripheral memory driver for each computer stores (block 520) status data on the central peripheral memory which is accessible to each computer through the KVM switch. In one embodiment, upon reboot of the computer (or otherwise starting of the peripheral memory application), the peripheral memory driver can automatically probe the O/S (Operating System) and collect configuration data and other status data (often referred to as the "recipe") for the system as well as applications installed on that particular system. The peripheral memory driver for each computer stores the status data for the associated computer in the central peripheral memory which is accessible to each computer through the KVM switch.

In one embodiment, the peripheral memory driver for each computer stores the status data for the associated computer in a text file in the central peripheral memory. Each computer connected to the KVM switch may have its own individual text file to store the status data for that particular computer. Thus, the text file for a particular computer may be identified by the IP (internet protocol) address of the particular computer, for example. It is appreciated that the computers may share status files and may be identified by a variety of identifications other than IP address, depending upon the particular application.

In another aspect, the peripheral memory driver can update the information saved in the text file on the central peripheral memory carried by the mouse in response to various events. For example, in one embodiment, whenever the associated system reboots or whenever there is an event generated on the system due to a hardware or application related problem, or when a timer periodically expires, the peripheral memory driver can update the information saved in the text file for that particular computer in the central peripheral memory. As another example, in the event of a system crash resulting in a memory dump, that memory dump information may also be sent to the central memory located on the mouse. Again, the memory dump information may be stored in a text file in the central memory where the name of the text file could be the same as the IP Address of the System that crashed.

The following is an example of the type of information which may be stored in a separate or shared text file for each system:

Hardware BIOS Version
Operating System installed on the system with version
CPU Configuration
Memory Configuration
Network Adapter: Manufacturer, Driver Version
RAID Controller: Manufacturer and Driver Version
Identification of Applications/processes running on the system.
Log of Any Events, Alerts (Warnings and Errors)
Captured Memory Dump or Crash Dump if Operating System crashes.

It is appreciated that other information in addition to or instead of the information set forth above may be stored for each computer in the central peripheral memory accessible through the KVM switch, depending upon the particular application.

In another operation, one of the computers connected to the KVM switch may change (block 530). If not, the peripheral memory drivers may continue to store status data (block 520) for the associated computer.

In the event that a computer is changed by altering or substituting a computer, a determination may be made as to whether (block 540) the identity of the computer has changed. Thus, in the example in which the computer IP address is used to identify the status information text file for that computer, a determination may be made as to whether (block 540) the IP address of the changed computer has changed. If not, the peripheral memory driver for the changed computer may continue to store status data (block 550) in the same text file as before the change. In one embodiment, the old text file may be overwritten with the new status data of the changed computer with the same IP address of the old computer. It is appreciated that in some applications, it may be appropriate to retain the text file of the computer prior to the change even where the prior computer had the same IP address as the new computer. In such situations, the old text file may be preserved by renaming, for example, to prevent overwriting by status data for the changed computer with the same IP address, for example.

Alternatively, if the IP address has changed (block 540), the peripheral memory driver for the changed computer can create (block 560) a new text file using the new IP address of the changed computer to identify the new text file, and store the status data for the changed computer in the new text file. In one embodiment, the old text file for the old computer with the different IP address may be retained for archive purposes.

In one aspect of the present description, the status data stored on the central peripheral memory permits the operator to readily review for example, the last configuration of a particular system before it crashed, what O/S was running or what processes were running on the system before the system went down. The operator can readily access the stored information for a particular computer notwithstanding that the particular computer may no longer be operational. For example, the operator can readily remove the peripheral central memory from the mouse and insert it into another slot to move or copy the status information text file to analyze for causation issues as well as for record keeping to track changes made to the system. For example, the operator can readily identify changes to system configuration or an O/S revision upgrade or a replacement of the O/S with some other operating system.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3-5 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3-5 may be implemented in software, hardware, programmable and non-programmable gate array logic or in some combination of hardware, software, or gate array logic.

Figure 6:
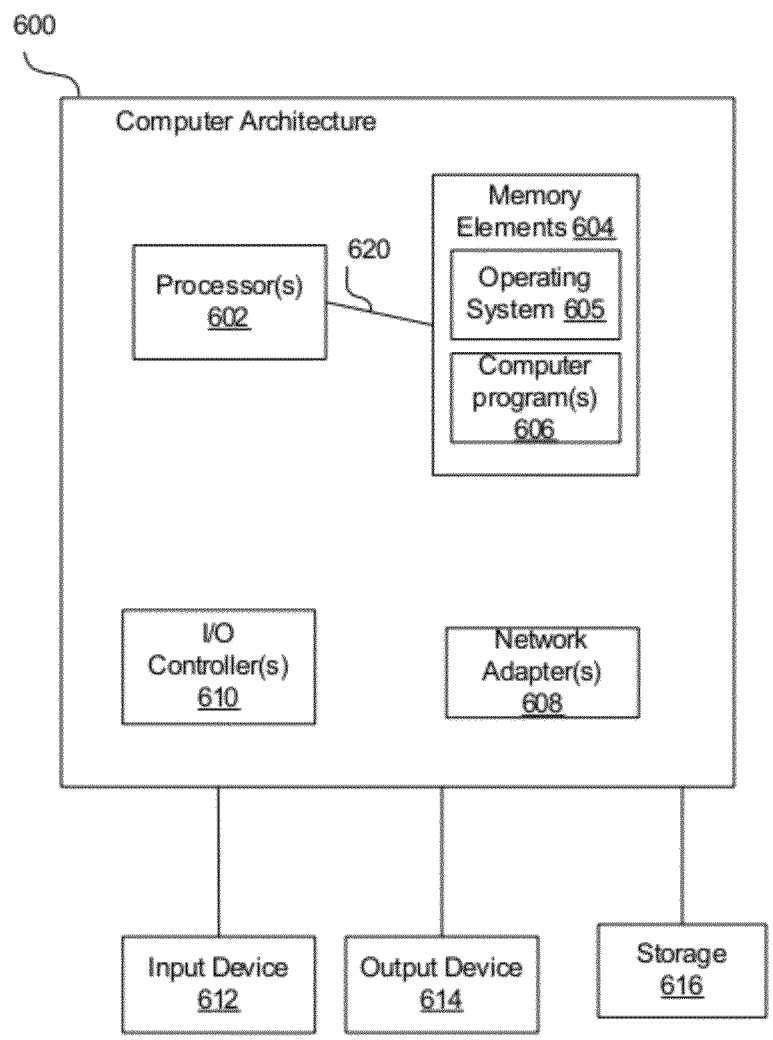
FIG. 6 illustrates a system architecture that may be used in accordance with certain embodiments.

FIG. 6 illustrates a system architecture 600 that may be used in accordance with certain embodiments. Computers 110*a*, 110*b* . . . 110*n* and 112*a*, 112*b* . . . 112 may each implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610. Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

A network coupling the system architecture 600 may comprise any type of network, such as, for example, a peer-to-peer network, spoke and hub network, Storage Area Network (SAN), a Local Area Network (LAN), Wide Area Network (WAN), the Internet, an Intranet, etc.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art. The storage 616 may comprise an array of storage devices, such as Direct Access Storage Devices (DASDs), Just a Bunch of Disks (JBOD), Redundant Array of Independent Disks (RAID), virtualization device, etc.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method, comprising:

operating a first computer using a plurality of input/output devices over input/output signal paths passing through a KVM (Keyboard Video Mouse) switch positioned between the first computer and the plurality of input/output devices;

switching input/output signal paths passing through the KVM switch for the plurality of input/output devices to be between a second computer and the plurality of input/output devices instead of between the first computer and the plurality of input/output devices;

operating the second computer using the plurality of input/output devices over the switched input/output signal paths passing through the KVM switch positioned between the second computer and the plurality of input/output devices;

passing status data over signal paths passing through the KVM switch wherein the status data represents status information for at least one of the first and second computers; and storing the status data passing through the KVM switch in a memory coupled to the KVM switch;

wherein one of said plurality of input/output devices is a mouse pointing device, said memory is a removable flash memory card, and said mouse has a memory slot adapted to receive said flash memory card, and wherein said status data is saved as a text file on said flash memory card for each computer of said first and second computers and wherein said text file of status data for each computer of said first and second computers includes an IP address of the associated computer as a unique identifier and differentiator between status information for each computer of said first and second computers.

2. The method of claim 1 further comprising maintaining status data paths passing through said KVM switch, so that said memory receives and stores status data from both said second computer and said first computer while operating the second computer using the plurality of input/output devices over the switched input/output signal paths passing through the KVM switch positioned between the second computer and the plurality of input/output devices.

3. The method of claim 1 further comprising:
installing a driver on each of said first and second computers, said driver causing the associated computer to store through said KVM switch, status data on said memory.

4. The method of claim 1 further comprising:
switching input/output signal paths passing through the KVM switch for the plurality of input/output devices to be between the first computer and the plurality of input/output devices instead of between the second computer and the plurality of input/output devices;
operating the first computer using the plurality of input/output devices over the switched input/output signal paths passing through the KVM switch positioned between the first computer and the plurality of input/output devices; and
reading said status data for said second computer on said memory, while operating the first computer using the plurality of input/output devices over the switched input/output signal paths passing through the KVM switch positioned between the first computer and the plurality of input/output devices.

5. The method of claim 1 wherein the status information includes at least one of following for items installed on the associated computer, Hardware BIOS Version, Operating System with version, CPU Configuration, Configuration of memory of the associated computer, Manufacturer and Driver Version of Network Adapter, Manufacturer and Driver Version of RAID Controller, Identification of running Applications and processes, Events Alerts including Warnings and Errors, Dump of memory of associated computer, and Dump of Operating System crash.

6. The method of claim 3 further comprising causing the driver installed on the associated computer to automatically probe the Operating system of the associated computer and collect configuration data for the associated computer, and identification data of applications installed on the associated computer and store the collected data on said memory coupled to the KVM switch.

7. The method of claim 6 wherein said causing the driver installed on the associated computer to automatically probe occurs on a reboot of the associated computer, said method further comprising updating the collected information stored on said memory of said plurality of devices connected to the associated computer in the event of at least one of a reboot, a warning message or an error message of the associated computer.

8. The method of claim 1 further comprising:
replacing the second computer with a third computer;
switching input/output signal paths passing through the KVM switch for the plurality of input/output devices to be between the third computer and the plurality of input/output devices instead of between the second computer and the plurality of input/output devices; and
storing status data for said third computer on said flash memory, wherein said storing for said third computer includes, if the IP Address of the third computer is same as the second computer, replacing existing status data for said second computer on said memory with status data for said third computer on said flash memory, and if the IP Address of the third computer is different from that of the second computer, retaining existing status data for said second computer on said flash memory and adding status data for said third computer on said flash memory.

9. A computer program product comprising a computer useable storage device including a computer readable program, wherein the computer readable program when executed on a computer system causes the computer system to:
permit operating a first computer using a plurality of input/output devices over input/output signal paths passing through a KVM (Keyboard Video Mouse) switch positioned between the first computer and the plurality of input/output devices;
switch input/output signal paths passing through the KVM switch for the plurality of input/output devices to be between a second computer and the plurality of input/output devices instead of between the first computer and the plurality of input/output devices;
permit operating the second computer using the plurality of input/output devices over the switched input/output signal paths passing through the KVM switch positioned between the second computer and the plurality of input/output devices;
passing status data over signal paths passing through the KVM switch wherein the status data represents status information for at least one of the first and second computers; and
store the status data passing through the KVM switch in a memory coupled to the KVM switch;
wherein one of said plurality of input/output devices is a mouse pointing device, said memory is a removable flash memory card, and said mouse has a memory slot adapted to receive said flash memory card and wherein the program further causes the computer system to:
permit removing said flash memory card from said mouse memory slot;
permit inserting said flash memory card into another memory slot; and
read said status data stored for said second computer on said memory; and
wherein said status data is saved as a text file on said flash memory card for each computer of said first and second computers and wherein said text file of status data for each computer of said first and second computers includes an IP address of the associated computer as a unique identifier and differentiator between status information for each computer of said first and second computers and wherein the status information includes at least one of following for items installed on the associated computer, Hardware BIOS Version, Operating System with version, CPU Configuration, Configuration of memory of the associated computer, Manufacturer and Driver Version of Network Adapter, Manufacturer and Driver Version of RAID Controller, Identification of running Applications and processes, Events Alerts including Warnings and Errors, Dump of memory of associated computer, and Dump of Operating System crash.

10. The computer program product of claim 9 wherein the program further causes the computer system to maintain status data paths passing through said KVM switch, so that said memory receives and stores status data from both said second computer and said first computer while the second computer is operated using the plurality of input/output devices over the switched input/output signal paths passing through the KVM switch positioned between the second computer and the plurality of input/output devices.

11. The computer program product of claim 9 wherein the program further includes a driver for installation on each of said first and second computers, said driver causing the associated computer to store through said KVM switch, status data on said memory wherein the driver installed on the associated computer automatically probes the Operating system of the associated computer and collects configuration data for the associated computer, and identification data of applications installed on the associated computer and stores the collected data on said memory coupled to the KVM switch, and wherein said probe occurs on a reboot of the associated computer, said computer program product further causing the computer system to update the collected information stored on said memory of said plurality of devices connected to the associated computer in the event of at least one of a reboot, a warning message or an error message of the associated computer.

12. The computer program product of claim 9 wherein the program further causes the computer system to:
switch input/output signal paths passing through the KVM switch for the plurality of input/output devices to be between the first computer and the plurality of input/output devices instead of between the second computer and the plurality of input/output devices;
permit operating the first computer using the plurality of input/output devices over the switched input/output signal paths passing through the KVM switch positioned between the first computer and the plurality of input/output devices; and
read said status data for said second computer on said memory, while operating the first computer using the plurality of input/output devices over the switched input/output signal paths passing through the KVM switch positioned between the first computer and the plurality of input/output devices.

13. The computer program product of claim 9 wherein the program further causes the computer system to:
permit replacing the second computer with a third computer;
switch input/output signal paths passing through the KVM switch for the plurality of input/output devices to be between the third computer and the plurality of input/output devices instead of between the second computer and the plurality of input/output devices; and
store status data for said third computer on said flash memory, wherein said storing for said third computer includes, if the IP Address of the third computer is same as the second computer, replacing existing status data for said second computer on said memory with status data for said third computer on said flash memory, and if the IP Address of the third computer is different from that of the second computer, retaining existing status data for said second computer on said flash memory and adding status data for said third computer on said flash memory.

14. A system, comprising:
a processor and a computer readable storage medium having computer readable program code embodied therein and executed by the processor to perform operations, the operations comprising:
permitting operation of a first computer using a plurality of input/output devices over input/output signal paths passing through a KVM (Keyboard Video Mouse) switch positioned between the first computer and the plurality of input/output devices;
switching input/output signal paths passing through the KVM switch for the plurality of input/output devices to be between a second computer and the plurality of input/output devices instead of between the first computer and the plurality of input/output devices;
permitting operation of the second computer using the plurality of input/output devices over the switched input/output signal paths passing through the KVM switch positioned between the second computer and the plurality of input/output devices;
passing status data over signal paths passing through the KVM switch wherein the status data represents status information for at least one of the first and second computers; and
storing the status data passing through the KVM switch in a memory coupled to the KVM switch;
wherein one of said plurality of input/output devices is a mouse pointing device, said memory is a removable flash memory card, and said mouse has a memory slot adapted to receive said flash memory card, and wherein the operations further comprise:
permitting removal of said flash memory card from said mouse memory slot;
permitting insertion of said flash memory card into another memory slot; and
reading said status data stored for said second computer on said memory; and
wherein said status data is saved as a text file on said flash memory card for each computer of said first and second computers and wherein said text file of status data for each computer of said first and second computers includes an IP address of the associated computer as a unique identifier and differentiator between status information for each computer of said first and second computers and wherein the status information includes at least one of following for items installed on the associated computer, Hardware BIOS Version, Operating System with version, CPU Configuration, Configuration of memory of the associated computer, Manufacturer and Driver Version of Network Adapter, Manufacturer and Driver Version of RAID Controller, Identification of running Applications and processes, Events Alerts including Warnings and Errors, Dump of memory of associated computer, and Dump of Operating System crash.

15. The system of claim 14 wherein the operations further comprise maintaining status data paths passing through said KVM switch, so that said memory receives and stores status data from both said second computer and said first computer while operating the second computer using the plurality of input/output devices over the switched input/output signal paths passing through the KVM switch positioned between the second computer and the plurality of input/output devices.

16. The system of claim 14 wherein the operations further comprise:
installing a driver on each of said first and second computers, and causing the driver installed on the associated computer to automatically probe the operating system of the associated computer on a reboot of the associated computer and collect configuration data for the associated computer, and identification data of applications installed on the associated computer and store through said KVM switch and on said memory, the collected data for associated computer; and causing the driver installed on the associated computer to update the collected information stored on said memory in the event of at least one of a reboot, a warning message or an error message of the associated computer.

17. The system of claim 14 wherein the operations further comprise:

switching input/output signal paths passing through the KVM switch for the plurality of input/output devices to be between the first computer and the plurality of input/output devices instead of between the second computer and the plurality of input/output devices;

permitting operation of the first computer using the plurality of input/output devices over the switched input/output signal paths passing through the KVM switch positioned between the first computer and the plurality of input/output devices;

reading said status data for said second computer on said memory, while operating the first computer using the plurality of input/output devices over the switched input/output signal paths passing through the KVM switch positioned between the first computer and the plurality of input/output devices.

18. The system of claim 14 wherein the operations further comprise:

permitting replacement of the second computer with a third computer;

switching input/output signal paths passing through the KVM switch for the plurality of input/output devices to be between the third computer and the plurality of input/output devices instead of between the second computer and the plurality of input/output devices; and storing status data for said third computer on said flash memory, wherein said storing for said third computer includes, if the IP Address of the third computer is same as the second computer, replacing existing status data for said second computer on said memory with status data for said third computer on said flash memory, and if the IP Address of the third computer is different from that of the second computer, retaining existing status data for said second computer on said flash memory and adding status data for said third computer on said flash memory.

19. A method, comprising: operating a first computer using a plurality of input/output devices including a keyboard, video display device and pointing device, over a plurality of corresponding input/output signal paths including a keyboard data path for the keyboard, a video data path for the video display device, and a pointing device data path for the pointing device, said input/output signal paths for the corresponding plurality of input/output devices passing through a KVM (Keyboard Video Mouse) switch positioned between the first computer and the plurality of input/output devices; switching input/output signal paths passing through the KVM switch for the plurality of input/output devices to be between a second computer and the plurality of input/output devices instead of between the first computer and the plurality of input/output devices; operating the second computer using the plurality of input/output devices over the switched input/output signal paths passing through the KVM switch positioned between the second computer and the plurality of input/output devices; passing status data over at least one of the signal paths passing through the KVM switch wherein the status data represents status information for at least one of the first and second computers; storing the status data passing through the KVM switch in a memory coupled to the KVM switch and located on one of said plurality of input/output devices; and wherein the status data for each computer of said first and second computers includes an IP address of the associated computer as a unique identifier and differentiator between status information for each computer of said first and second computers.

20. The method of claim 19 further comprising:

installing a driver on each of said first and second computers, said driver causing the associated computer to store through said KVM switch, status data on said memory.

21. The method of claim 19 wherein said pointing device is a mouse pointing device, said memory is a removable flash memory card, and said mouse pointing device has a memory slot adapted to receive said flash memory card.

22. The method of claim 21 wherein said status data is saved as a text file on said flash memory card for each computer of said first and second computers and wherein said text file of status data for each computer of said first and second computers includes an IP address of the associated computer as a unique identifier and differentiator between status information for each computer of said first and second computers.

23. The method of claim 21 further comprising:

removing said flash memory card from said mouse memory slot;

inserting said flash memory card into another memory slot; and reading said status data stored for said second computer on said memory.

24. The method of claim 22 wherein the status information includes at least one of following for items installed on the associated computer, Hardware BIOS Version, Operating System with version, CPU Configuration, Configuration of memory of the associated computer, Manufacturer and Driver Version of Network Adapter, Manufacturer and Driver Version of RAID Controller, Identification of running Applications and processes, Events Alerts including Warnings and Errors, Dump of memory of associated computer, and Dump of Operating System crash.

25. The method of claim 20 further comprising causing the driver installed on the associated computer to automatically probe an Operating system of the associated computer and collect configuration data for the associated computer, and identification data of applications installed on the associated computer and store the collected configuration data on said memory coupled to the KVM switch.

* * * * *